(12) United States Patent
Kartanson et al.

(10) Patent No.: US 10,094,506 B2
(45) Date of Patent: Oct. 9, 2018

(54) CORRUGATED METAL PIPE REPAIR SYSTEM AND METHOD

(71) Applicant: Marketing Associates, Inc., Mount Airy, NC (US)

(72) Inventors: John Murray Kartanson, Wiston-Salem, NC (US); Scott Joseph Kammerer, Winston-Salem, NC (US)

(73) Assignee: MARKETING ASSOCIATES, INC., Mount Airy, NC (US)

( * ) Notice: Subject to any disclaimer, the term of this patent is extended or adjusted under 35 U.S.C. 154(b) by 358 days.

(21) Appl. No.: 14/806,600

(22) Filed: Jul. 22, 2015

(65) Prior Publication Data

US 2017/0023167 A1    Jan. 26, 2017

(51) Int. Cl.
| | |
|---|---|
| *F16L 55/162* | (2006.01) |
| *F16L 55/164* | (2006.01) |
| *F16L 55/163* | (2006.01) |
| *E03F 3/06* | (2006.01) |

(52) U.S. Cl.
CPC ....... *F16L 55/162* (2013.01); *E03F 2003/065* (2013.01); *F16L 55/163* (2013.01); *F16L 55/164* (2013.01)

(58) Field of Classification Search
CPC . E03F 2003/065; F16L 55/162; F16L 55/163; F16L 55/164
See application file for complete search history.

(56) References Cited

U.S. PATENT DOCUMENTS

| | | |
|---|---|---|
| 1,929,817 A | 10/1933 | Helsing |
| 2,081,872 A | 5/1937 | Kahn et al. |
| 2,746,090 A | 5/1956 | Hoover |
| 5,980,670 A | 11/1999 | Andre |
| 7,979,970 B2 | 7/2011 | Williams |
| 8,418,336 B2 | 4/2013 | Bennett |
| 2011/0135403 A1 * | 6/2011 | Dudding ............... E02D 31/002 405/272 |

FOREIGN PATENT DOCUMENTS

| | | | |
|---|---|---|---|
| CA | 2252338 A1 * | 5/2000 | ............... E02B 5/00 |
| DE | 8005736 U1 | 6/1980 | |
| WO | 2009075647 A1 | 6/2009 | |
| WO | WO 2009075647 A1 * | 6/2009 | ............. E01F 5/005 |

OTHER PUBLICATIONS

Miliken nfrastructure, Concrete Cloth, Geocynthetic Cementitious Composite Mat, 2 Pages, Aug. 2014.*

(Continued)

*Primary Examiner* — Jacob Cigna
(74) *Attorney, Agent, or Firm* — Spilman, Thomas & Battle, PLLC (57) ABSTRACT

Corrugated metal pipe repair system and method, an embodiment including the securing of one or more sheets to the corrugated pipe and over a damaged portion of the pipe including voids, the delivering of glass particles into the voids and possibly also cavities in ground adjacent to the corrugated metal pipe, and the delivering of a polymer that expands to fill at least a portion of the voids and possibly also a portion of the cavities not filled by the glass particles.

22 Claims, 8 Drawing Sheets

(56) References Cited

OTHER PUBLICATIONS

Black Beauty(Tm) Glass—the original black beauty abrasives, <www.blackbeautyabrasives.com/products/black-beauty-glass-abrasives.php>.*

Spetec(R) PR H40 Data Sheet and Safety Sheet, 9 Pages, Nov. 2014.*

Harsco, "Black Beauty(R) Glass Abrasives Product Specification Sheet", 1 Page.*

E-procurement solicitation, 2007, p. 3, North Carolina Department of Transportation.

Culvert rehabilitation project specification (Caswell County, North Carolina), 2008.

Culvert rehabilitation project specification (Caswell County, North Carolina), circa 2010/2011.

\* cited by examiner

CORRUGATED METAL PIPE REPAIR SYSTEM AND METHOD

FIELD OF THE INVENTION

This invention is related to pipe repair, and more particularly to repair of corrugated metal pipe.

BACKGROUND OF THE INVENTION

Corrugated pipe, such as corrugated metal pipe, is used in various civil engineering applications, such as in culverts, stormwater storage systems, and sewers, both storm and sanitary. These pipes are flexible and use structural bedding and backfill to maintain ring compression (shape). Properly installed, the compressed ring permits live and dead loads to be distributed into the surrounding backfill and thus relieve some of the load on the pipe wall. The combination of corrugation size, metal type, thickness, and backfill type and compaction in these pipe installations provide increased strength over rigid pipes, permitting them to be buried at substantially greater depths with negligible deflection.

However, as with rigid pipe, corrugated metal pipe tends to wear, especially in the invert where the structure is exposed to constant or high velocity waters, corrosive run-off, and/or abrasive flows. Corrugated metal pipe used in applications listed above are also often made of either aluminum or steel with optional protective coatings such as zinc (galvanized), zinc and asphalt, zinc and polymer, or aluminum/steel alloy. All types and coating combinations, however, tend to corrode or abrade over time. As a result of this erosion/corrosion cycle, perforations eventually form in the pipe's invert. Such voids may extend through the pipe and thereby expose the structural bedding and backfill to erosion, scour, and undermining. This cycle creates substantial cavities around the pipe exterior. As erosion of the bedding and backfill continues, soil begins to migrate from the surrounding area through the perforations. The initial clue that soil is infiltrating the pipe is a sinkhole. The continued loss of structural bedding and backfill, and growing cavities around the pipe exterior, will lead to localized wall buckling and, if left unchecked, will eventually lead to critical deformation and ultimate collapse. Corrugated metal pipes structurally need good, well-compacted backfill for support. The loss of that support affects the overall structural capacity of the pipe.

Materials such as crushed stone or walnut shell may be delivered under the corrugated metal pipe where the bedding has eroded to stabilize that area. However, such materials as delivered with current means may not reach many of the cavities in the ground that are small or a significant distance from the point the materials are delivered. The walnut shell may also rot, destabilizing the areas in which it is disposed.

Further, with corrugated metal pipe used in applications involving most storm waterways, water quality standards set by government agencies dictate that an environmentally friendly non-invasive repair system be used.

Accordingly, there may be a need for a corrugated metal pipe repair system and method that delivers a stronger material that is yet environmentally safe to fill voids in the pipe and/or cavities around the pipe, thereby redeeming the structural bedding and backfill zones. There may also be a need for a corrugated metal pipe repair system and method that delivers such a material over a wider area than do traditional systems and can infiltrate remote areas.

SUMMARY OF THE INVENTION

In an embodiment, a method of repairing a corrugated metal pipe includes: positioning one or more sheets against the corrugated metal pipe over a damaged portion of the corrugated metal pipe, the damaged portion comprising one or more voids; securing the one or more sheets to the corrugated metal pipe and over the damaged portion of the corrugated metal pipe; delivering glass particles into the one or more voids; and delivering a polymer that expands to fill, at least in part, a portion of the one or more voids.

In another embodiment, a system for repairing a corrugated metal pipe includes: one or more sheets to be placed over a damaged portion of the corrugated metal pipe and to be secured over the damaged portion of the corrugated metal pipe, the damaged portion comprising one or more voids; glass particles to be delivered into the one or more voids; and a polymer to be delivered to expand into at least a portion of the one or more voids.

In another embodiment, a method of repairing a corrugated metal pipe includes: positioning one or more sheets against the corrugated metal pipe over a damaged portion of the corrugated pipe; securing the one or more sheets to the corrugated metal pipe and over the damaged portion of the corrugated pipe; delivering glass particles into one or more cavities in ground adjacent to the damaged portion of the corrugated metal pipe; and delivering a polymer that expands to fill at least a portion of the one or more cavities.

Other embodiments, which may include one or more parts of the aforementioned method or system or other parts, are also contemplated, and may thus have a broader or different scope than the aforementioned method and systems. Thus, the embodiments in this Summary of the Invention are mere examples, and are not intended to limit or define the scope of the invention or claims.

BRIEF DESCRIPTION OF THE DRAWINGS

The accompanying drawings, wherein like reference numerals are employed to designate like components, are included to provide a further understanding of corrugated metal pipe repair systems and methods, are incorporated in and constitutes a part of this specification, and illustrate embodiments of corrugated metal pipe repair systems and methods that together with the description serve to explain the principles of corrugated metal pipe repair systems and methods.

Various other objects, features, and advantages of the invention will be readily apparent according to the following description exemplified by the drawings, which are shown by way of example only, wherein.

DETAILED DESCRIPTION

Reference will now be made to embodiments of a corrugated metal pipe repair system and method, examples of which are illustrated in the accompanying drawings. Details, features, and advantages of the corrugated metal pipe repair system and method will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the invention. The appearances of such terms in various places in the specification do not necessarily all refer to the same embodiment. References to "or" are furthermore intended as inclusive, so "or" may indicate one or another of the "ored" terms or more than one "ored" term.

Figure 1:
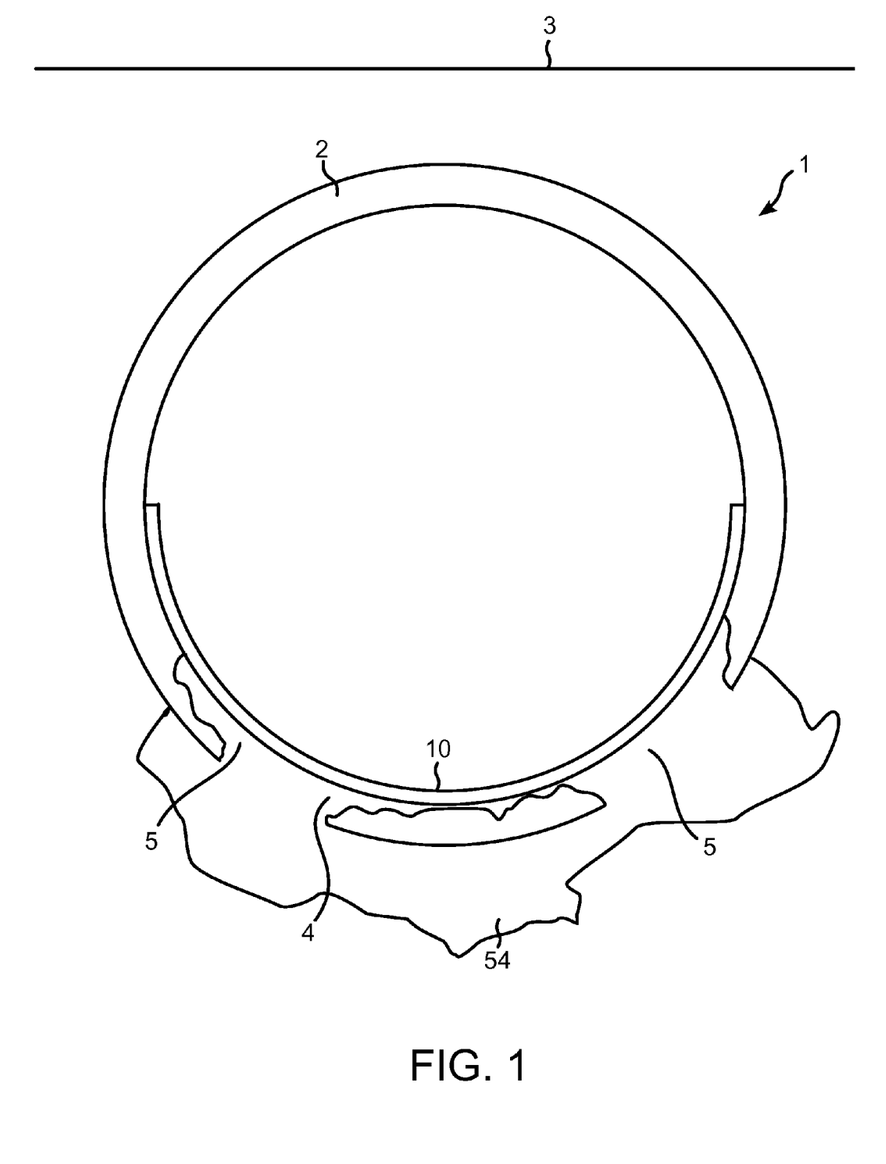
FIGS. 1-2 illustrate cross-sectional views of embodiments of a system for repairing a corrugated metal pipe.
Figure 2:
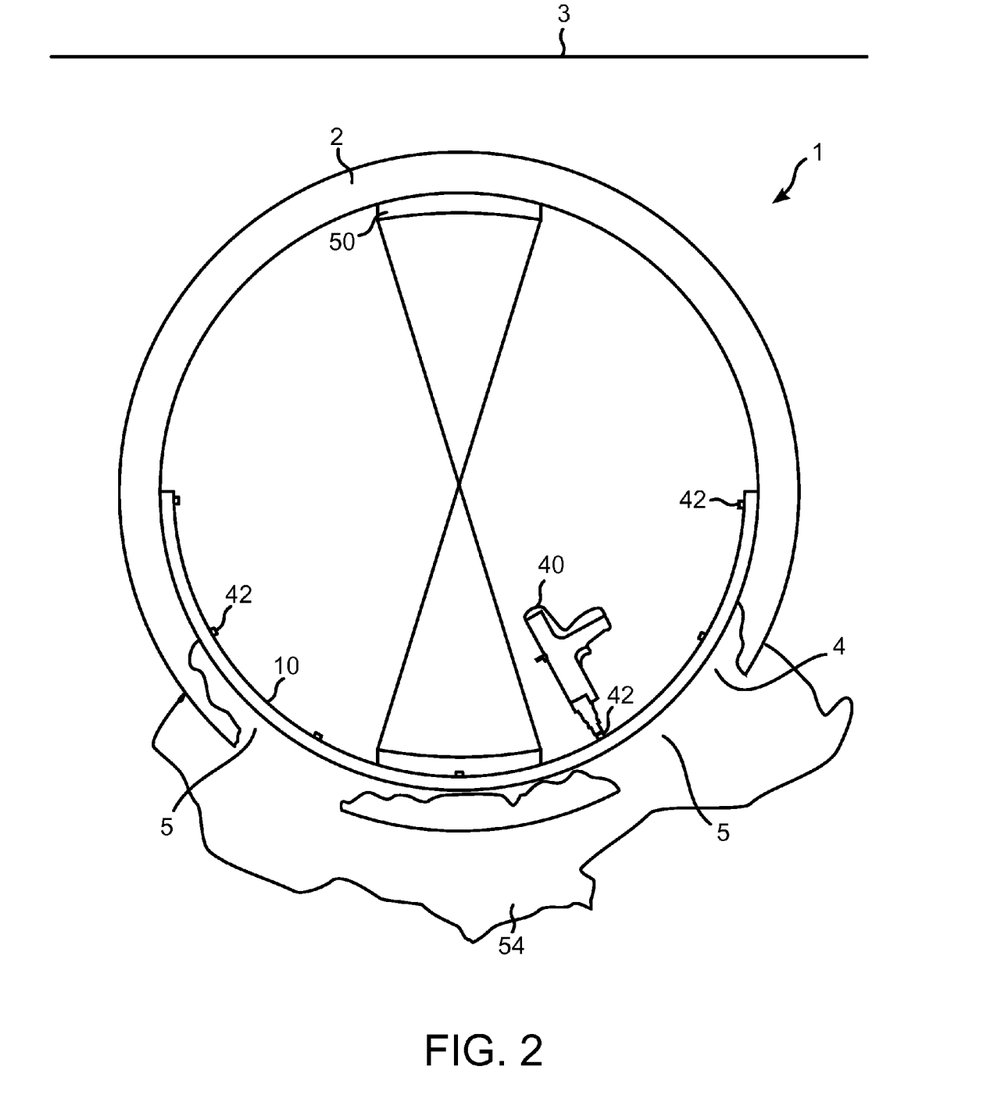
Figure 3:
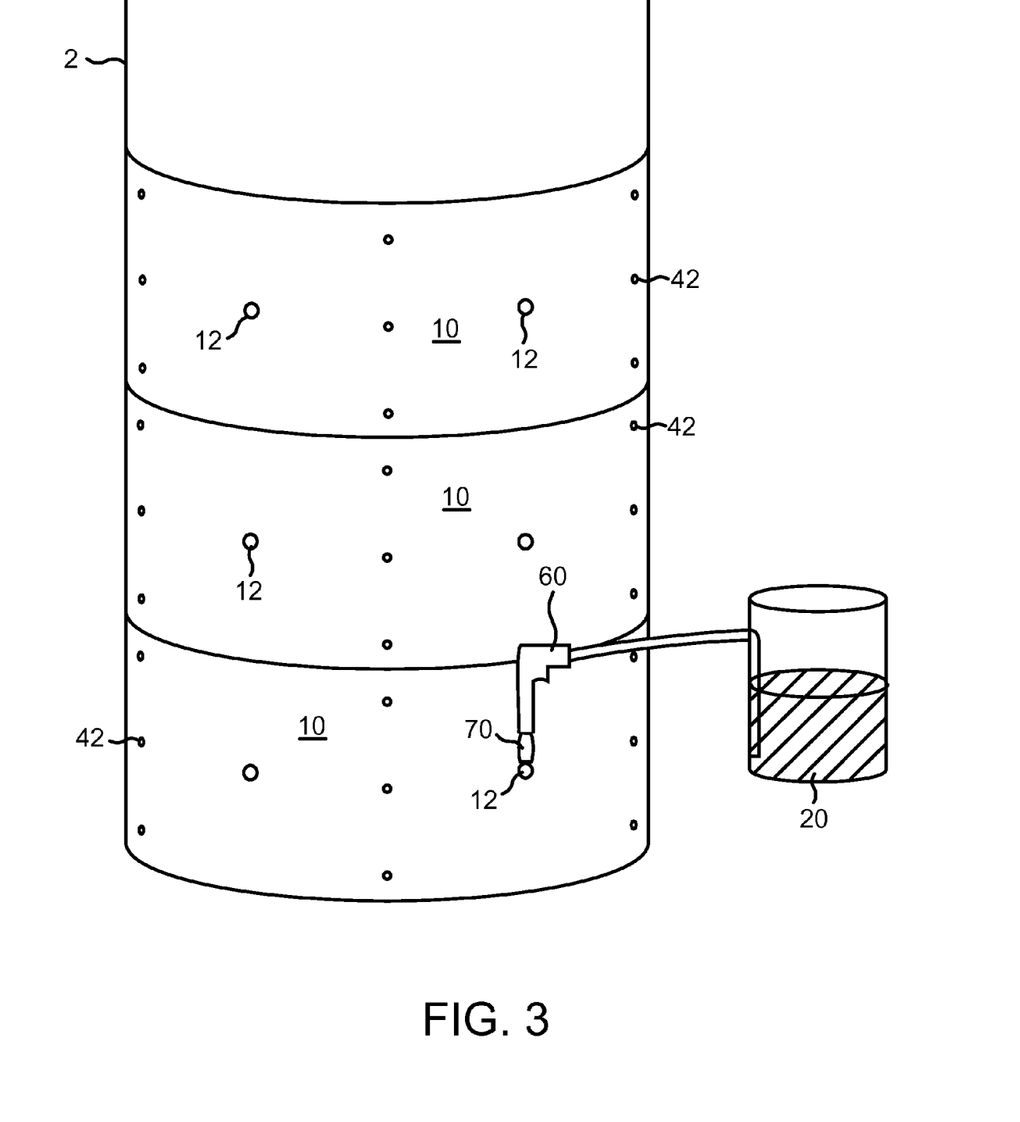
FIGS. 3-4 illustrate cutaway top views of embodiments of a system for repairing a corrugated metal pipe.
Figure 4:
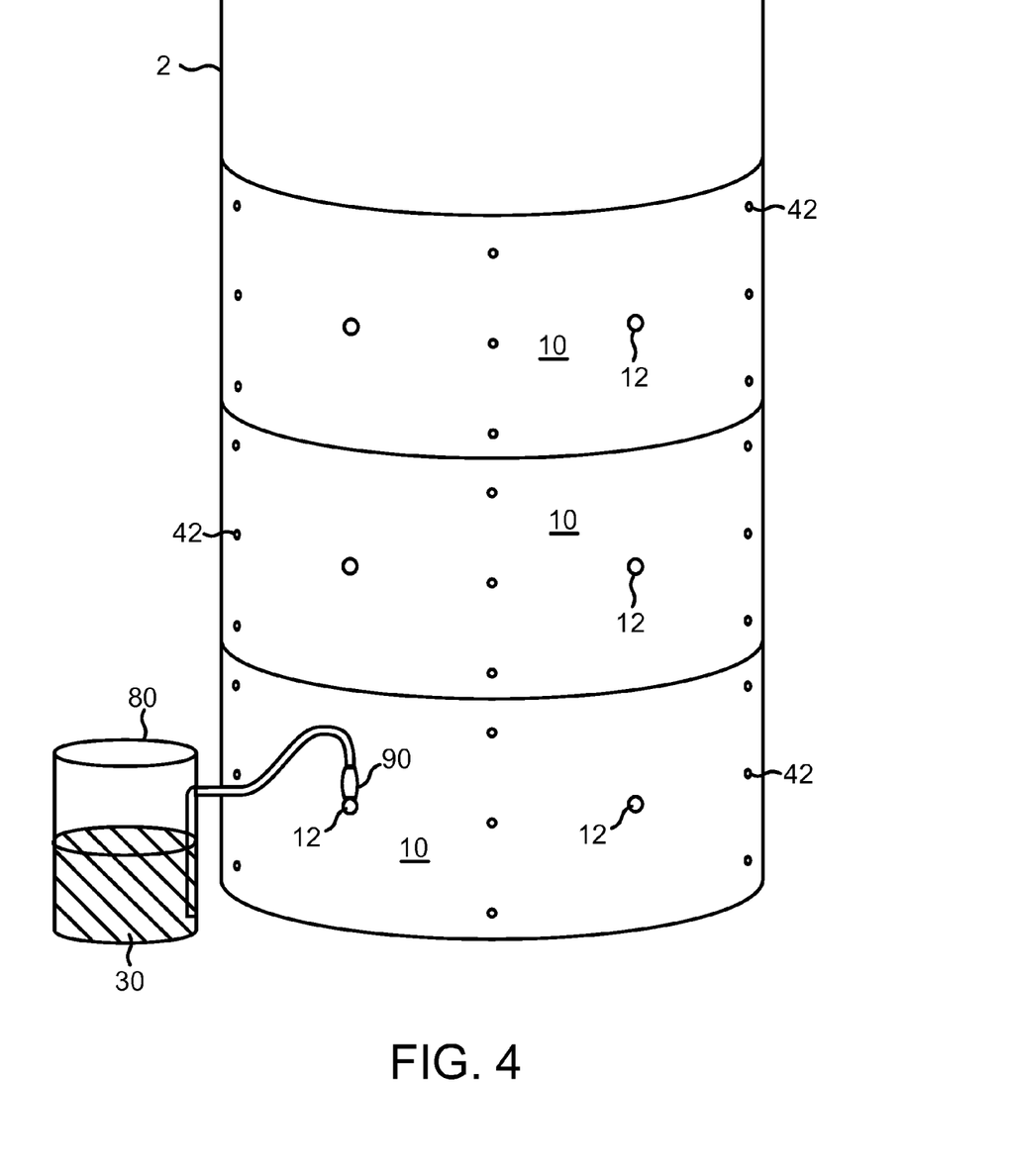
Figure 5:
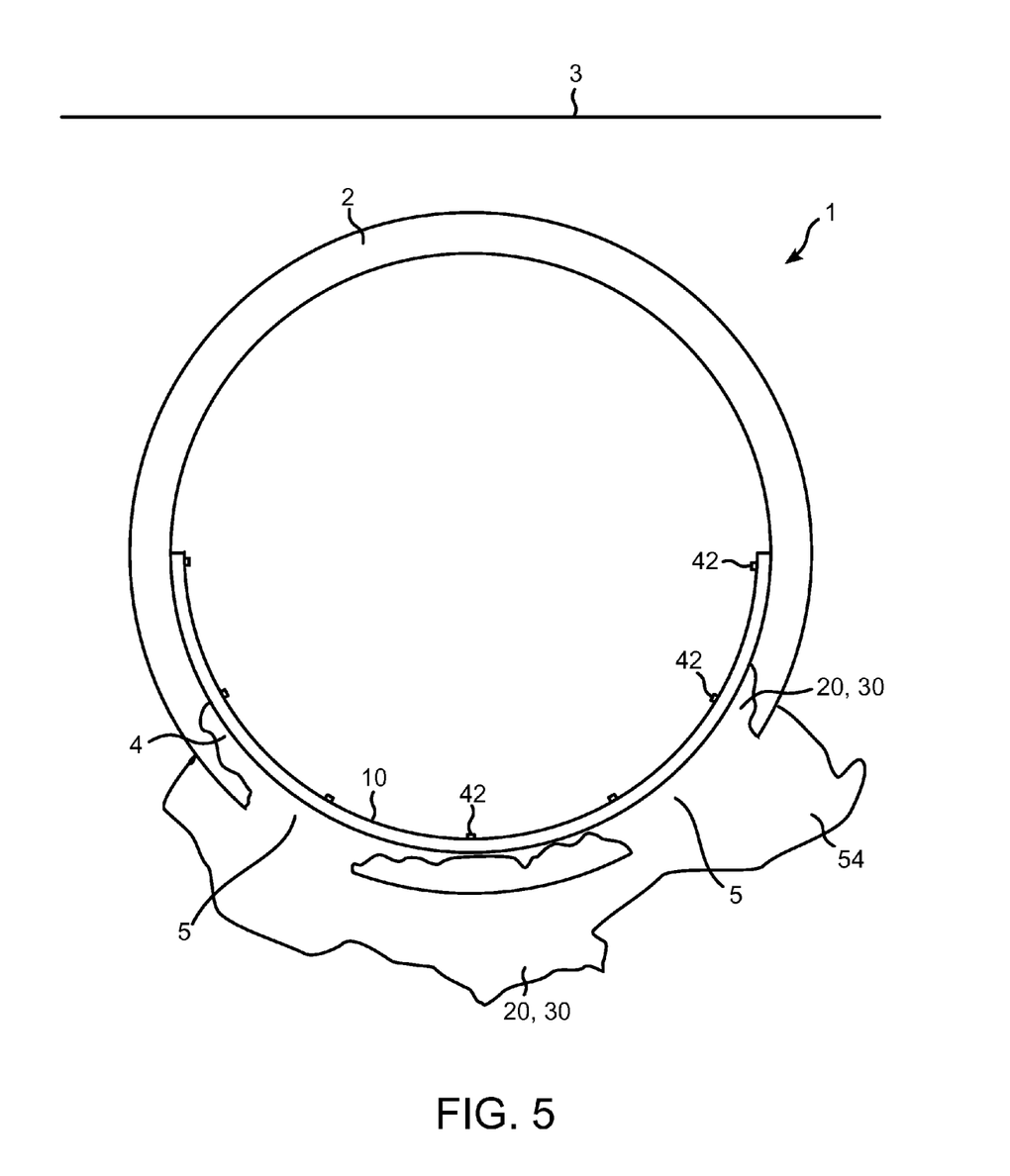
FIG. 5 illustrates a cross-sectional view of an embodiment of a system for repairing a corrugated metal pipe.

FIGS. 1-5 illustrate a system 1 for repairing a corrugated pipe 2, which may be a corrugated metal pipe, in accordance with one embodiment. FIGS. 1-2 show cross-sectional views, FIGS. 3-4 show cutaway top views, and FIG. 5 shows a cross-sectional view. The corrugated metal pipe 2 may be positioned partially or fully under the surface 3 of the ground, or otherwise situated. The system 1 may include one or more sheets 10, glass particles 20, and a polymer 30.

The one or more sheets 10 may be a desired material, such as aluminum or another material. For example, the one or more sheets 10 may be of Grade 3004 aluminum and 0.064 to 3/16 inch thick and may be sized for civil engineering applications such as for culverts, stormwater storage systems, and sewers, both storm and sanitary, or may be another material and differently graded and gaged. Such sheets 10 may be flexible in an embodiment, and thus of a material and size and thickness such that they can be readily bent to the contour of the corrugated metal pipe 2 when being secured thereto, as described below.

As shown in FIG. 1, for example, the one or more sheets 10 may be positioned over a damaged portion 4 of the corrugated metal pipe 2 and secured to the corrugated metal pipe 2 over the damaged portion 4. The one or more sheets 10 may be shingled to prevent undermining, or placed such that the edge of one sheet 10 is placed over the edge of another sheet 10, and so on. The damaged portion 4 may be, for example, one or more voids 5. The one or more voids 5 may be one or more perforations, open pipe joints, and/or other holes that extend partially or fully through the corrugated metal pipe 2. The damaged portion 4 may be a result of corrosion, abrasion or any other wear or damage to the corrugated metal pipe 2. The damaged portion 4 may be part or all of the portion of the corrugated metal pipe 2 that is actually damaged, and may include voids 5 and possibly other worn or corroded areas. The one or more sheets 10 may be secured to the corrugated metal pipe 2 over the damaged portion 4 as desired, such as by fastening the one or more sheets 10 to the corrugated metal pipe 2 with fasteners 42. The fasteners 42 may be nails, anchors, or other fasteners. The nails, anchors, or other fasteners may be stainless steel in one embodiment, or another material.

For example, in one embodiment as shown in FIG. 2, the one or more sheets 10 are secured over the damaged portion 4 by fastening the one or more sheets 10 to the corrugated metal pipe 2 over the damaged portion 4 with fasteners 42 delivered using a powder-actuated tool 40. The powder-actuated tool 40 may fire the fasteners 42, through the one or more sheets 10 and into the corrugated metal pipe 2.

A powder-actuated tool 40, such as a Hilti gun or a Ramset gun or other powder-actuated nail gun or delivery tool, for example, may be a more powerful, efficient, and effective delivery system for securing the one or more sheets 10 to the corrugated metal pipe 2 than past fastening systems, such as those using self-tapping screws. For example, use of self-tapping screws may add the step of first drilling a pilot hole through the one or more sheets 10 and corrugated metal pipe 2. Additionally, delivery of the fasteners 42 using the powder-actuated tool 40 may result in greater penetration of those fasteners 42 than the penetration of self-tapping screws.

Also as shown in FIG. 2, during the securing process in an embodiment, to hold the one or more sheets 10 against the corrugated metal pipe 2 and over the damaged portion 4 as the one or more sheets 10 are fastened to the corrugated pipe 2, a jack 50 may be used. The jack 50 may be positioned against the inside of the corrugated metal pipe 2 and against the one or more sheets 10. The jack 50 may be a hydraulic jack in one embodiment. The hydraulic jack may be used to secure the one or more sheets 10 to the corrugated metal pipe 2 over a damaged portion 4 of the corrugated metal pipe 2 by holding the one or more sheets 10 against the corrugated metal pipe 2 over the damaged portion 4. The hydraulic jack may be braced against opposing surfaces of the corrugated metal pipe 2, such as shown. Such a jack 50, which may be, or may be similar to, a 4-ton hydraulic bar ram in an embodiment, with its various sized bars for varying pipe diameters and customized feet, may be used in the system 1.

As described above, in an embodiment, the sheets 10 are flexible. For example, the sheets 10 may be flexible such that they may be initially flat but may be readily bent to the contour of the corrugated metal pipe 2. Such sheets 10 may be bendable by hand or with the aid of the jack 50. Such sheets 10 may be bent against the corrugated metal pipe 2 without damaging the sheets 10 and without needing enough force to significantly deform the corrugated metal pipe 2. Sheets 10 that are flexible may allow for adaptability as compared to pre-curved, rigid sheets, as flexible sheets 10 may be bent to various curvatures and thus fit differently-sized and curved corrugated metal pipes 2.

In one embodiment, the jack 50 remains against the inside of the corrugated metal pipe 2 and holds the one or more sheets 10 over the damaged portion 4 of the corrugated metal pipe 2 as the glass particles 20 and polymer 30 are delivered under the one or more sheets 10 and into the damaged portion 4, such as described below. However, the jack 50 may be removed during delivery of the glass particles 20 and/or polymer 30 if desired.

In an embodiment, the glass particles 20 may be delivered into at least the one or more voids 5 of the damaged portion 4 of the corrugated metal pipe 2 prior to the securing of the one or more sheets 10 over the damaged portion 4.

In an embodiment, such as when large cavities 54 around the corrugated metal pipe 2 are present, the glass particles 20 may be delivered prior to and then also after securing the one or more sheets 10 over the damaged portion 4 of the corrugated metal pipe 2. For example, voids 5 and/or large cavities 54 may have glass particles 20 delivered directly thereto, prior to the securing of the one or more sheets 10. Then, after the one or more sheets 10 are secured, glass particles 20 may be delivered under the sheets 10 to "top off" the volume delivered.

The glass particles 20 may include course and/or fine pieces of glass. The glass particles 20 may be glass aggregate of one or more sizes, such as glass beads and/or granules. The glass particles 20 may be glass blasting beads. Though such glass particles 20 are generally used to clean, deburr, finish, and peen, such as for the removal of rust, paint, scale, and other surface coatings from a variety of substrates such as steel, aluminum, concrete, bricks, and wood, the glass particles 20 are used herein as for reparation of a damaged corrugated metal pipe and also, in an embodiment, its structural bedding and backfill that is used to maintain shape and enhance durability of the corrugated metal pipe 2. Glass particles, such as glass beads, are durable, and may be completely dry, i.e., oven dry, which may prevent the areas into which they are delivered from becoming moister and possibly rusting or otherwise corroding. Additionally, as described below, the glass particles 20 may be delivered over a wider area to cover more of the damaged portion 4 of the corrugated metal pipe 2 and, if applicable, a greater portion of sinkholes and/or other cavities 54 below or above the corrugated metal pipe 2.

In one embodiment, the glass particles 20 contain less than one percent silica, such as Black Beauty® glass abrasive manufactured by Harsco. Glass particles 20 that contain less than one percent silica may be chemically inert and may be environmentally safer than use of particles, such as sand, that are substantially or mostly composed of silica. Using glass particles 20 containing a low percentage of silica may prevent silicosis, a form of occupational lung disease caused by inhalation of crystalline silica dust. Such a material may be safe for both a crew that handles it and also for the surrounding environment.

In one embodiment, such as shown in FIG. 3, the system 1 for repairing a corrugated metal pipe 2 includes a blasting machine 60. A blasting machine 60 is a machine that uses pressure, such as from compressed air or another compressed fluid or from a centrifugal wheel, to propel an abrasive or other material against a metal or other surface to smooth, roughen, clean, decorate, or otherwise treat the surface. For example, the blasting machine 60 may be a sandblaster or other abrasive blasting machine. However, in embodiments, the blasting machine 60 may be used to deliver the glass particles 20 into the one or more voids 5 of the damaged portion 4 before or after securing the one or more sheets 10 to the corrugated metal pipe 2.

In an embodiment, such as shown in FIGS. 3-4, the one or more sheets 10 each have one or more holes 12. Referring to FIG. 3, in an embodiment, the blasting machine 60 may be used to deliver the glass particles 20 under the one or more sheets 10 and into the one or more voids 5 and possibly also one or more cavities 54 by propelling the glass particles 20 through one or more of the holes 12 in the one or more sheets 10. The glass particles 20 may otherwise be delivered under the one or more sheets 10 and into the one or more voids 5 or may be delivered into the one or more voids 5 before the one or more sheets 10 are secured.

The blasting machine 60 may deliver the glass particles 20 cleanly and under high pressure to facilitate delivery of the glass particles 20 over a wide area. If the blasting machine 60 delivers the glass particles through the one or more holes 12, it may do so directly, such as through a nozzle 70, or in another way in other embodiments.

By using a blasting machine 60, such as a sandblaster in one embodiment, the glass particles 20 may be propelled at a high speed. As such, the glass particles 20 may be propelled over a wider area than filler material delivered via a traditional delivery means of injection. The glass particles 20 may thus travel over a greater area, migrating into areas farther from the point or points in which the glass particles 20 are delivered and into small areas. Delivering the glass particles 20 using a blasting machine 60, such as a sandblaster, may thus result in the glass particles 20 infiltrating a greater portion of the one or more voids 5 and, in an embodiment, a greater portion of the one or more cavities 54 in ground adjacent to the corrugated metal pipe 2.

Additionally, the glass particles 20 may be closer to uniform in size than common bedding and backfill material such as well-graded crushed stone or various types of soils and thus deliverable by the sandblaster or other blasting machine 60, which may not be able to deliver the crushed stone.

In an embodiment, the glass particles 20 are delivered into the damaged portion 4 and possibly one or more cavities 54 before the polymer 30 is delivered, such as under the one or more sheets 10, and into the damaged portion 4.

In an embodiment, the polymer 30 is a moisture-activated single component hydrophobic polyurethane, such as AFT Soil Stab compounded and designed to stabilize soil, fill voids and cavities, and cut off gushing water leaks in below-ground structures. The moisture-activated single component hydrophobic polyurethane may be approved by the American National Standards Institute (ANSI) for introduction into the ground and for use with potable water systems. The moisture-activated single component hydrophobic polyurethane may permeate loose soil and areas in which the glass particles 20 are delivered to provide further support to the corrugated metal pipe 2. The moisture-activated single component hydrophobic polyurethane may expand more slowly and/or less powerfully than a polymer that is two component and not moisture-activated, and the moisture-activated single component hydrophobic polyurethane may thus not, or be less likely to, raise or otherwise misalign the one or more sheets 10 when delivered under the one or more sheets 10 as described herein. In an embodiment, the moisture-activated single component hydrophobic polyurethane may be completely dibutyl phthalate free and may provide a product that is safer for technicians using it and for the environment in general. In the embodiment in which the glass particles 20 are delivered before the polymer 30 and into the damaged portion 4 including the voids 5, the polymer 30 may fill some or all of the portions of the voids 5 not filled by the glass particles 20. The polymer 30 may fill some or all of the remaining damaged portion 4 not filled by the glass particles by, at least in part, expanding. In the embodiment in which the polymer 30 is a moisture-activated single component hydrophobic polyurethane, that polyurethane may be activated to expand via exposure to the moisture in the ground and/or adjacent to the corrugated metal pipe 2. The polymer 30 may be delivered under the one or more sheets 10 and into the one or more voids 5 of the damaged portion 4 by injecting the polymer 30 through the holes 12 or otherwise injecting the polymer 30 under the one or more sheets 10 and into the one or more voids 5 of the damaged portion 4 or directly into the one or more voids 5 prior to securing the sheets 10. For example, referring to FIG. 4, an injecting device 80 such as a pump may be used to inject the polymer 30 through one or more of the holes 12 of the one or more sheets 10. The injecting device 80 may deliver the polymer 30 through the one or more holes 12 by way of a grease fitting 90 attached to the one or more holes 12 in the one or more sheets 10. The grease fitting 90 may be any type of grease fitting, and may be referred to as a Zerk or Alemite fitting and may be generally used to deliver grease into a bearing using a grease gun. The polymer 30 may be otherwise delivered.

In an embodiment, the polymer 30 may be delivered, at least in part, into at least the one or more voids 5 and possibly also one or more cavities 54 prior to the securing of the one or more sheets 10 over the damaged portion 4. Thus, the polymer 30 may be delivered prior to and then also after securing the one or more sheets 10.

In an embodiment such as shown in FIG. 5, the glass particles 20 and polymer 30 may further or alternatively be delivered into the one or more cavities 54 adjacent to the outside of the corrugated metal pipe 2, such as in cavities 54 in the ground and under or otherwise surrounding the corrugated metal pipe 2. For example, high velocity waters may have flowed through any voids 5 extending completely through the corrugated metal pipe 2 and thus underneath or otherwise outside of the corrugated metal pipe 2, causing degradation and erosion of bedding soil, resulting in large cavities 54. The glass particles 20 and polymer 30 may be delivered into, and partially or fully fill, those cavities 54. In an embodiment, a blasting machine 60 is used to deliver the glass particles 20 into the one or more cavities 54. As described above, the blasting machine 60, such as a sandblaster in one embodiment, may propel the glass particles 20 over a wider area than filler material disposed using traditional means. Therefore, the glass particles 20 may travel over a greater distance and fill more of the cavities 54 in the ground, including those having small areas and those that are far from the position in which the glass particles 20 are propelled from the blasting machine 60.

Delivering both glass particles 20 and a polymer 30 that expands into the damaged portion 4 voids 5 of the corrugated metal pipe 2 and/or into cavities 54 in the ground surrounding the corrugated metal pipe 2 may result in a stronger material than if just a polymer 30 were disposed. Because of the greater strength of the glass particles 20, the glass particles 20 may serve to reinforce the polymer 30, resulting in a stronger and more stable material as compared to merely a polymer 30. Additionally, the glass particles 20 may be less expensive than the polymer 30, so use of the glass particles 20 in place of some of the polymer 30 may result in a cost savings.

Figure 6:
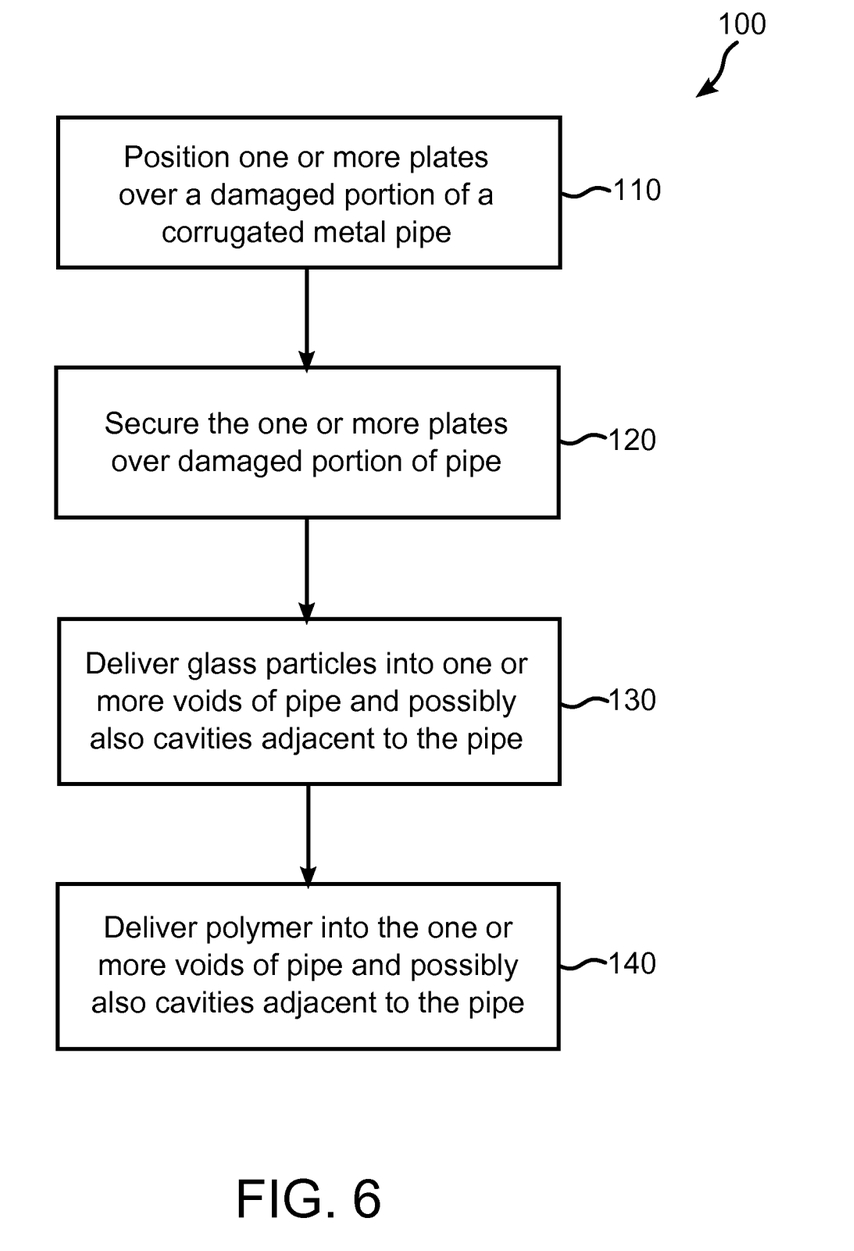
FIG. 6 is a flow chart of a method of repairing a corrugated metal pipe, in accordance with embodiments.

FIG. 6 is a flow chart of a method 100 of repairing a corrugated metal pipe, such as a corrugated metal pipe 2, in accordance with one embodiment. Referring also to the system of FIGS. 1-5 along with FIG. 6, the method 100 includes, at 110, positioning one or more sheets 10 over a damaged portion 4 of the corrugated metal pipe 2. The damaged portion 4 may include voids 5, such as described above.

At 120, the one or more sheets 10 may be secured over the damaged portion 4. Securing the one or more sheets 10 over the damaged portion 4 may include holding the one or more sheets 10 against the damaged portion 4 with a jack 50. In an embodiment, the jack 50 is a hydraulic jack. In an embodiment, the securing of the one or more sheets 10 over the damaged portion 4 includes fastening the one or more sheets 10 to the corrugated metal pipe 2 with fasteners 42 that are stainless steel nails or anchors 42 using a powder-actuated tool 40, such as described above.

At 130, glass particles 20 are delivered either directly into the one or more voids 5 and possibly also the one or more cavities 54 and/or under the one or more sheets 10 and into the voids 5 and possibly also the cavities 54 adjacent to the corrugated metal pipe 2. Thus, 130 may be performed before (or before and after) 120 such that the glass particles 20 are delivered into the one or more voids 5 and possibly the one or more cavities 54 before (or before and after) the one or more sheets 10 are secured over the damaged portion 4. In one embodiment, the glass particles 20 are delivered by being propelled with a blasting machine 60. In an embodiment, the blasting machine 60 is a sandblaster. As described above, the blasting machine 60 may be able to deliver the glass particles 20 at a high speed, which may cause the glass particles 20 to be propelled over a wider area than traditional filler material delivered by injection or another traditional means. The glass particles 20 may thus travel over a greater area, migrating into small areas and infiltrating a greater percentage of the voids 5 and cavities 54.

In an embodiment, the glass particles 20 are delivered at various points along the corrugated metal pipe 2. For example, the glass particles 20 may be delivered by positioning the blasting machine 60 at various positions from one side (e.g., 3 o'clock position along corrugated metal pipe 2 from cross-sectional view shown in FIG. 1) to the other side (e.g., 9 o'clock position) in a corrugated pipe 2 that is cylindrical.

In an embodiment, at 130, the glass particles are delivered before and/or after the one or more sheets 10 are secured, into the one or more cavities 54 (and not necessarily any void 5).

In an embodiment, at 130, the glass particles 20 that are delivered are chemically inert. In another embodiment, the glass particles 20 contain less than one percent silica. Delivering glass particles 20 that are chemically inert and/or less than one percent silica may provide an environmentally safe option as compared to delivering high-silica material such as sand.

At 140, a polymer 30 is delivered such that it expands into the one or more voids 5 and/or the one or more cavities 54. The polymer 30 may be delivered under the one or more sheets 10, such as by injection. The polymer 30 may be an expanding polymer that expands after being introduced below the one or more sheets 10 and encountering moisture. The polymer 30 may expand to fill a remaining portion, such as some or all of the area, of the voids 5 and possibly also the cavities 54 not filled by the glass particles 20. In an embodiment, at 140, the polymer 30 delivered is a moisture-activated single component hydrophobic polyurethane, free of dibutyl phthalate.

In an embodiment, at 140, the polymer 30 is delivered into the one or more voids 5 and possibly also the one or more cavities 54 prior to 120, and thus, at least in part, prior to when the one or more sheets 10 are secured over the damaged portion 4 of the corrugated metal pipe 2. In one embodiment at 140, the polymer 30 is delivered, before and/or after the sheets 10 are secured, into the one or more cavities 54 (and not necessarily any void 5).

In an embodiment of the method 100 of repairing a corrugated metal pipe, the jack 50 continues to hold the one or more sheets 10 against the damaged portion 4 of the corrugated metal pipe 2 while the glass particles 20 are delivered at 130 and while the polymer 30 is delivered at 140. Holding the one or more sheets 10 during 130 and 140 delivery, may further secure the one or more sheets 10 against force caused by contact with the propelled glass particles 20 and/or the polymer 30.

As described above, at 130 and 140, the glass particles 20 and polymer 30 may, in addition to filling at least part of the voids 5 adjacent to the corrugated metal pipe 2, travel into the ground, such as if the corrugated metal pipe 2 has any voids 5 extending through the thickness of the corrugated metal pipe 2. As described with respect to the system 1 above, the glass particles 20 and polymer 30 may thus travel not only into the voids 5 adjacent to the corrugated metal pipe 2, but also travel into one or more sinkholes or other cavities 54 adjacent to the corrugated pipe 2 and underground. In an embodiment that includes using a blasting machine 60, such as a sandblaster, to deliver the glass particles 20, the glass particles 20 may be propelled with enough force to travel over a wide area, and thus into portions of the cavities 54 that materials delivered by traditional methods may not reach.

At 130 and/or 140, the glass particles 20 and polymer 30 may be delivered, if desired, through one or more holes 12 in the one or more sheets 10 in a 9-to-3 clock position (from the view of FIG. 1, for example), such as described above. Such a delivery may propel the glass particles 20 and polymer 30 at various positions and at various angles to reach more of the voids 5 of the damaged portion 4 and possibly also the cavities 54.

As shown in FIG. 5, after delivery of the glass particles 20 using a blasting machine 60, such as a sandblaster, and delivery and subsequent expansion of the polymer 30, the glass particles 20 and polymer 30 may have infiltrated a higher percentage of the damaged portion 4 including voids 5 and, if applicable, the cavities 54 than traditional systems. Combining the reach of those materials using the delivery system 1 and method 100 described herein and the strength of the glass particles 20 as discussed above, the system 1 and method 100 provide for a strong and durable corrugated metal pipe repair solution that is also environmentally safe.

As desired, the system 1 for and method 100 of repairing a corrugated metal pipe 2 may include the sealing of the one or more sheets 10 prior to the glass particles 20 and/or polymer 30 being delivered thereunder. Sealing the one or more sheets 10 may include delivery of a sealant such as a hydraulic cement that may be sloped to minimize effects from future abrasion due to water running over the one or more sheets 10 and sealant. Additionally, a coating may be applied over the one or more sheets 10, such as a bitumen/latex emulsion coating. In an embodiment, the coating is an elastomeric spray coating such as a polymer-modified, two-component elastomeric coating. The coating may further protect the one or more sheets 10 and repaired areas from future damage. The sealant and/or coating may cover the one or more holes 10 in an embodiment or the holes 10 may be otherwise covered.

Also, if desired, the corrugated metal pipe 2 may be cleaned before applying the system 1 and method 100, such as by high-pressure power washer and hand-brooming. Additionally if desired, joints in the corrugated pipe 2 may be sealed and backgrouted. Further if desired, the inlet of the corrugated pipe 2 may be reinforced, such as by construction of a toe wall using bags of polymer-impregnated sand or cement.

Figure 7:
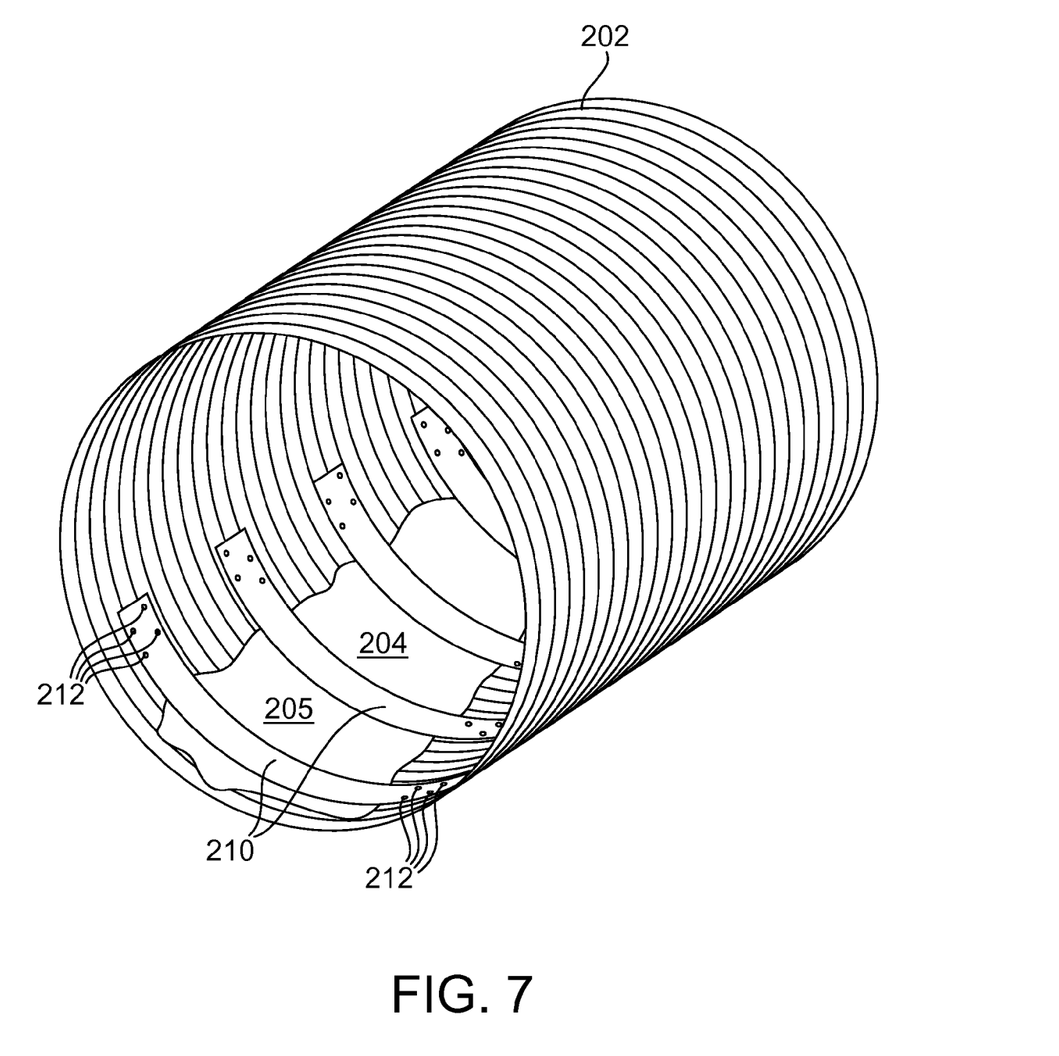
FIG. 7 illustrates a perspective view of embodiments of a system for repairing a corrugated metal pipe.
Figure 8:
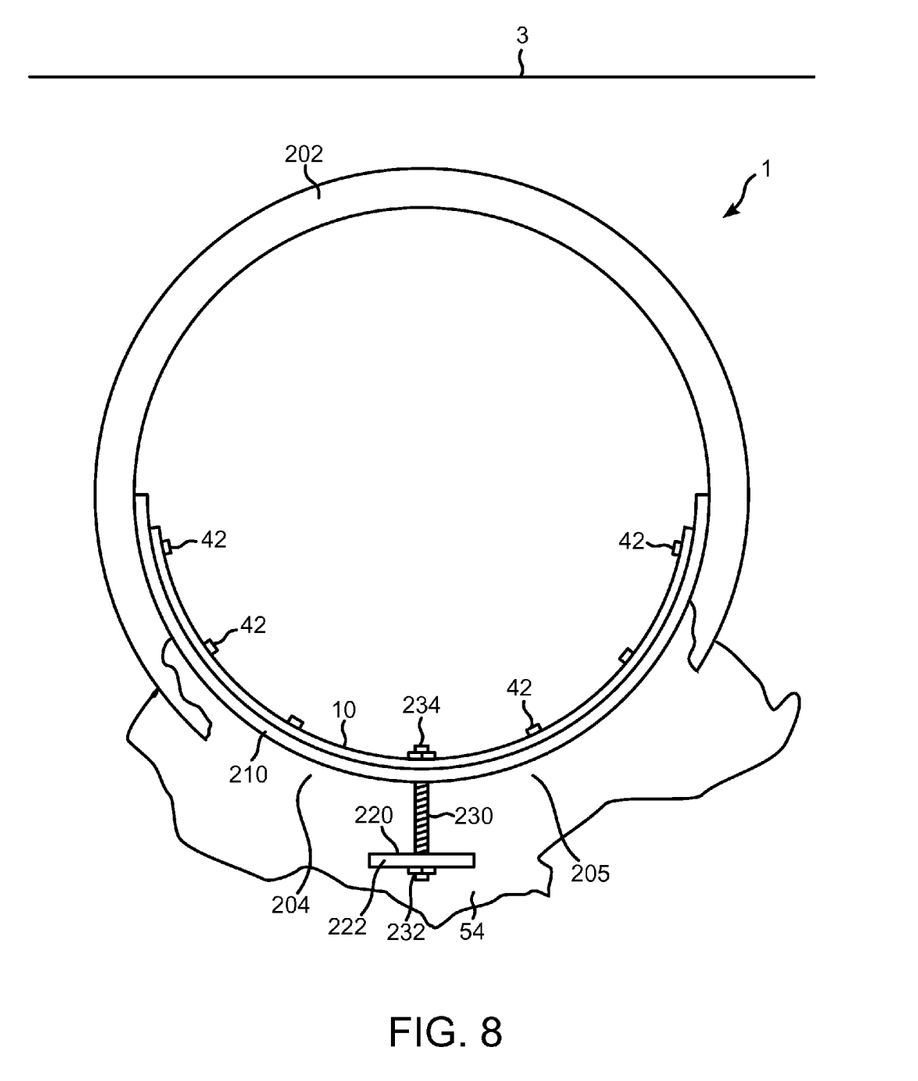
FIG. 8 illustrates a perspective view of embodiments of a system for repairing a corrugated metal pipe.

In any of the embodiments described above, one or more slats and possibly also one or more base plates may be included, such as when the bottom portion (invert) and/or another portion of a corrugated metal pipe is significantly damaged. FIGS. 7 and 8 illustrate embodiments of such additions to the systems and methods herein. Referring to those figures, the damaged portion 204 of the corrugated metal pipe 202 may be significant. For example, the corrugated metal pipe 202 may have one or more voids 205 such that a substantial portion of, or even the entirety of, the bottom portion of the corrugated metal pipe 202 is missing or corroded. In such a case, the one or more sheets 10 may not have enough of a (or any) corrugated metal pipe 202 surface in that damaged portion 204 against which to rest and be secured. One or more slats 210 may be included to provide surfaces to which the one or more sheets 10 may be secured, and may thus assist in securing the one or more sheets 10 to the corrugated metal pipe 202.

The one or more slats 210 may be secured to the corrugated metal pipe 202. For example, each slat 210 may be secured at either of its ends to the corrugated metal pipe 202 via one or more fasteners 212. Each slat 210 may be bent to, or pre-shaped with, the contour of the corrugated metal pipe 202. Each slat 210 may be sized and shaped as desired.

For example, in an embodiment, each slat 210 may be an elongated piece that is long enough to extend across the damaged portion 204 of the corrugated metal pipe 202, such as shown in FIG. 7. Each slat 210 may also be long enough to extend up the interior of the corrugated metal pipe 202 further than that of the one or more sheets 10 attached thereto, such as shown in FIG. 8. Each slat 210 may be wide enough to at least extend across adjacent corrugation crests of the corrugated metal pipe 202 to allow fastening of the slat 210 to the two crests via the fasteners 212. The one or more slats 210 may be otherwise shaped and sized as desired. The one or more slats 210 may comprise, for example, 7 to 12 gauge aluminum, and may be strong enough to support one or more sheets 10 in the contour in which the one or more sheets 10 are secured thereto.

In an embodiment, the slats 210 may be flexible and thus of a material and size and thickness such that they can be readily bent to the contour of the corrugated metal pipe 2 when being secured thereto. For example, the slats 210 may be flexible such that they may be initially flat but may be readily bent to the contour of the corrugated metal pipe 2. Such flexible slats 210 may be bendable by hand or with the aid of the jack 50. Such flexible slats 210 may be bent against the corrugated metal pipe 2 without damaging the slats 210 and without needing enough force to significantly deform the corrugated metal pipe 2. Slats 210 that are flexible may allow for adaptability as compared to pre-curved, rigid slats 210, as flexible slats 210 may be bent to various curvatures and thus fit differently-sized and curved corrugated metal pipes 2.

If multiple slats 210 are used, the slats 210 may be spaced from each other as desired. For example, the slats 210 may be between about one foot apart, between about two and three feet apart, or otherwise spaced. The slats 210 may have identical shapes and sizes, or may vary in shape and size.

After the one or more slats 210 are secured to the corrugated metal pipe 202 such as shown in FIG. 7, the one or more sheets 10 may be secured to the corrugated metal pipe 202, at least in part by way of the one or more slats 210, as shown in FIG. 8. Thus, each sheet 10 may be secured to the corrugated metal pipe 202 and over the damaged portion 204 of the corrugated metal pipe 202 by being fastened to the corrugated metal pipe 202. In an embodiment, each sheet 10 may be fastened to the corrugated metal pipe 202 by being fastened directly to the corrugated metal pipe 202 as described herein and also to one or more slats 210 (which are themselves secured to the corrugated metal pipe 202), or by being fastened only to the one or more slats 210. Each sheet 10 may be fastened as desired, such as by use of the fasteners 42 described herein.

In an embodiment as shown in FIG. 8, one or more base plates 220 may be used with the one or more slats 210, such as when the damaged portion 204 of the corrugated metal pipe 202 is significant. For example, one base plate 220 may be included for every three or four slats 210 included, or a different ratio of base plates 220 to slats 210 may be used. The ratio may depend on the extent of the damaged portion 204, such that a higher ratio of base plates 220 to slats 210 may be used if the damaged portion 204 is more extensive, though the ratio may be customized as desired.

Each base plate 220 may include a plate 222 and a rod 230 that extends from the plate 222. The plate 222 may be of a desired material and shape and size. For example, the plate 222 may be of steel and be 4×4 inches or 6×8 inches and with a desired thickness. The rod 230 may be any elongated piece, such as a 0.5 inch diameter threaded rod of steel or other material, for example, and may be secured to the plate 222. The rod 230 may be secured to the plate 222 via a screw, bolt, or other fastener 232 as shown, or may be welded to, formed with, or otherwise secured to the plate 222. The length of the rod 230 may vary depending on how far under the corrugated metal pipe 202 the plate 222 of the base plate 220 is to be disposed. For example, the plate 222 may be disposed at the bottom of the cavity 54 under the corrugated metal pipe 202 or elsewhere within the cavity 54, with the rod 230 long enough to extend to and be secured to one or two sheets 10 (may be two sheets 10 if rod 230 is secured to overlapping portions of two adjacent sheets 10).

The base plate 220 may thus be secured to one or more sheets 10 by securing the rod 230 of the base plate 220 to the one or more sheets 10. For example, the rod 230 may extend through the one or two sheets 10, and the rod 230, and thus the base plate 220, may be secured to the one or two sheets 10 by way of a screw, bolt, or other fastener 234, or by other means. If multiple base plates 220 are used, each base plate 220 may be secured to one or two sheets 10 such as described above. Each base plate 220 may be considered secured to the one or two sheets 10 if the rod 230 extends through the one or two sheets 10 and is restricted from removal therefrom, such as by being blocked via the plate 222 on one end and the fastener 234 or other securing means on the other end, such as shown in FIG. 8.

In an embodiment, the securing of each base plate 220 to the one or more sheets 10 may include securing of each base plate 220 to one of the one or more slats 210. For example, the rod 230 of each base plate 220 may extend through both a slat 210 and further through one or two sheets 10 and then be secured thereto (as described above with respect to the base plate 220 and one or more sheets 10), such as with the fastener 234. In another embodiment, one or more of the base plates 220 may be positioned such that their rods 230 each extend through one or more sheets 10, but are not aligned with a slat 210 and thus do not extend through a slat 210.

If desired, as with the one or more slats 210, the base plate 220 may be positioned before the one or more sheets 10, and possibly also the one or more slats 210, are secured to the corrugated metal pipe 202, such as for ease of assembly. In such a case, for each base plate 220, a sheet 10 or overlapping portions of two sheets 10 may be positioned over the positioned base plate 220 such that the rod 230 of the base plate 220 extends through the one or two sheets 10 (and possibly also a slat 210) and the base plate 220 may then be secured to the one or two sheets 10 (and possibly also the slat 210).

In an embodiment including one or more base plates 220, glass particles 20 and polymer 30 may be delivered as described herein, and may surround or encapsulate each base plate 220 to further hold the base plate 220, including its plate 222 and rod 230, in place. As so held, each base plate 220 may support the sheet or sheets 10 to which it is secured against buckling upward, such as by blocking upward movement of the sheet or sheets 10 via the fastener 234 or other securing means.

In the method 100 described above with respect to FIG. 6, in an embodiment in which one or more slats 210 and possibly also the base plates 220 are included, at 120 the one or more sheets 10 may be secured over the damaged portion 4, in part, by securing the one or more slats 210 to the corrugated metal pipe 202 and securing one or more of the sheets 10 each to at least one of the slats 210. The method at 120 may further include securing each of the one or more base plates 220 to at least one of the sheets 10, either via one of the one or more slats 210 or directly to the one or more sheets 10.

While specific embodiments of the invention have been described in detail, it should be appreciated by those skilled in the art that various modifications and alterations and applications could be developed in light of the overall teachings of the disclosure. Accordingly, the particular arrangements, products, and methods disclosed are meant to be illustrative only and not limiting as to the scope of the invention.

What is claimed is:

1. A method of repairing a corrugated metal pipe, comprising: positioning one or more sheets against the corrugated metal pipe over a damaged portion of the corrugated pipe, the damaged portion comprising one or more voids; securing the one or more sheets to the corrugated metal pipe and over the damaged portion of the corrugated metal pipe; delivering glass particles into the one or more voids; and delivering a polymer that expands to fill at least a portion of the one or more voids; wherein the glass particles are propelled in a dry state with a blasting machine into the one or more voids through a nozzle in fluid communication with one or more holes in the one or more sheets.

2. The method of claim 1, wherein the delivering of the glass particles into the one or more voids is, at least in part, prior to the securing of the one or more sheets.

3. The method of claim 1, wherein the delivering of the polymer that expands to fill at least a portion of the one or more voids is, at least in part, prior to the securing of the one or more sheets.

4. The method of claim 1, wherein the securing of the one or more sheets over the damaged portion of the corrugated metal pipe comprises fastening the one or more sheets to the corrugated metal pipe using a powder-actuated tool.

5. The method of claim 1, wherein the blasting machine comprises a sandblaster.

6. The method of claim 1, wherein the delivering of the glass particles comprises delivering glass particles containing less than one percent free silica.

7. The method of claim 1, wherein the one or more sheets being positioned and secured are flexible.

8. The method of claim 1, wherein the securing of the one or more sheets over the damaged portion of the corrugated metal pipe comprises holding the one or more sheets against the damaged portion of the corrugated metal pipe with a hydraulic jack and then fastening the one or more sheets to the corrugated metal pipe.

9. The method of claim 8, wherein the hydraulic jack holds the one or more sheets against the damaged portion of the corrugated metal pipe while the glass particles and the polymer are delivered under the one or more sheets.

10. The method of claim 1, wherein the delivering of the polymer comprises delivering a moisture-activated single component hydrophobic polyurethane.

11. The method of claim 7, wherein the moisture-activated single component hydrophobic polyurethane being delivered is butyl phthalate free.

12. The method of claim 1, wherein: the delivering of the glass particles into the one or more voids further comprises delivering the glass particles into one or more cavities in ground adjacent to the corrugated metal pipe; and the delivering of the polymer that expands to fill at least the portion of the one or more voids further comprises delivering the polymer such that it expands into the one or more cavities in the ground adjacent to the corrugated metal pipe.

13. The method of claim 12, wherein the delivering of the glass particles into the one or more voids and the one or more cavities is, at least in part, prior to the securing of the one or more sheets.

14. The method of claim 12, wherein the delivering of the polymer that expands to fill at least the portion of the one or more voids and expands into the one or more cavities is, at least in part, prior to the securing of the one or more sheets.

15. The method of claim 1, further comprising: securing one or more slats to the corrugated metal pipe over the damaged portion of the corrugated metal pipe; and wherein the securing of the one or more sheets to the corrugated metal pipe and over the damaged portion of the corrugated metal pipe comprises securing at least one of the one or more sheets to at least one of the one or more slats.

16. The method of claim 15, further comprising: securing one or more base plates each to at least one of the one or more sheets.

17. The method of claim 15, wherein the one or more slats are flexible.

18. A method of repairing a corrugated metal pipe, comprising: positioning one or more flexible sheets each including one or more holes against the corrugated pipe over a damaged portion of the corrugated metal pipe, the damaged portion comprising one or more voids; holding the one or more sheets over the damaged portion of the corrugated pipe with a hydraulic jack; fastening the one or more sheets to the corrugated metal pipe using a powder-actuated tool; delivering glass particles that include less than one percent free silica into the one or more voids and further into one or more cavities in ground adjacent to the corrugated metal pipe by propelling, through at least one of the one or more holes and under the one or more one or more sheets, using a sandblaster, the glass particles; and delivering a polymer through at least one of the one or more holes and under the one or more sheets, the polymer expanding to fill at least a portion of both the one or more voids and the one or more cavities.

19. The method of claim 18, wherein the delivering of the glass particles is, at least in part, prior to the fastening of the one or more sheets to the corrugated metal pipe.

20. A method of repairing a corrugated metal pipe, comprising: positioning one or more sheets against the corrugated metal pipe over a damaged portion of the corrugated pipe; securing the one or more sheets to the corrugated metal pipe and over the damaged portion of the corrugated pipe; delivering glass particles into one or more cavities in ground adjacent to the damaged portion of the corrugated metal pipe through one or more holes in the one or more sheets and under the one or more sheets, using a sandblaster; and delivering a polymer that expands to fill at least a portion of the one or more cavities.

21. The method of claim 20, wherein the delivering of the glass particles into the one or more cavities is, at least in part, prior to the securing of the one or more sheets.

22. The method of claim 20, wherein the delivering of the polymer that expands to fill at least a portion of the one or more cavities is, at least in part, prior to the securing of the one or more sheets.

\* \* \* \* \*